(12) United States Patent
Hottovy et al.

(10) Patent No.: US 9,605,095 B2
(45) Date of Patent: *Mar. 28, 2017

(54) POLYMERIZATION PRODUCT PRESSURES IN OLEFIN POLYMERIZATION

(71) Applicant: Chevron Phillips Chemical Company LP, The Woodlands, TX (US)

(72) Inventors: John D. Hottovy, Porter, TX (US); Scott E. Kufeld, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,401

(22) Filed: May 6, 2016

(65) Prior Publication Data

US 2016/0251459 A1 Sep. 1, 2016

Related U.S. Application Data

(63) Continuation of application No. 14/810,734, filed on Jul. 28, 2015, now abandoned, which is a (Continued)

(51) Int. Cl.
  *B01J 19/00* (2006.01)
  *C08F 2/00* (2006.01)
  (Continued)

(52) U.S. Cl.
  CPC ............. *C08F 210/02* (2013.01); *C08F 2/01* (2013.01); *C08F 110/02* (2013.01); *C08F 210/14* (2013.01); *C08F 2400/02* (2013.01)

(58) Field of Classification Search
  CPC ... C08F 210/14; C08F 110/02; C08F 2400/02
  (Continued)

(56) References Cited

U.S. PATENT DOCUMENTS

| 3,248,179 A | 4/1966 | Norwood |
| 4,312,967 A | 1/1982 | Norwood et al. |

(Continued)

FOREIGN PATENT DOCUMENTS

| EP | 0891990 A2 | 1/1999 |
| EP | 1630178 A1 | 3/2006 |

(Continued)

OTHER PUBLICATIONS

Foreign communication from a related counterpart application—International Search Report and Written Opinion, PCT/JS2013/066842, Jan. 22, 2014, 9 pages.

(Continued)

*Primary Examiner* — William Cheung
(74) *Attorney, Agent, or Firm* — Conley Rose, P.C.; Rodney B. Carroll; Monte Rhodes

(57) ABSTRACT

A process for making a low density polymer in a polymerization reactor system, the process comprising polymerizing an olefin monomer, and optionally an olefin comonomer, in the presence of a diluent in a polymerization reactor to make a polymerization product slurry consisting of a liquid phase and a solid phase, wherein the solid phase comprises an olefin polymer having a density of between about 0.905 g/cm$^3$ to about 0.945 g/cm$^3$; and discharging the polymerization product slurry from the polymerization reactor through a continuous take-off valve to make a mixture further comprising a vapor phase. The mixture comprises a pressure less than a bubble point pressure of a component in the polymerization product slurry.

20 Claims, 2 Drawing Sheets

Related U.S. Application Data continuation of application No. 14/447,973, filed on Jul. 31, 2014, now Pat. No. 9,120,886, which is a continuation of application No. 13/886,893, filed on May 3, 2013, now Pat. No. 8,871,886, application No. 15/148,401, which is a continuation-in-part of application No. 12/699,729, filed on Feb. 3, 2010, now Pat. No. 9,358,515.

(51) Int. Cl.
    *C08F 210/00*     (2006.01)
    *C08F 210/02*     (2006.01)
    *C08F 210/14*     (2006.01)
    *C08F 110/02*     (2006.01)
    *C08F 2/01*     (2006.01)

(58) Field of Classification Search
    USPC .................................. 526/64, 348; 422/131
    See application file for complete search history.

(56) References Cited

U.S. PATENT DOCUMENTS

| | | | |
|---|---|---|---|
| 4,501,885 A | 2/1985 | Sherk et al. | |
| 4,588,790 A | 5/1986 | Jenkins, III et al. | |
| 4,589,957 A | 5/1986 | Sherk et al. | |
| 4,754,007 A | 6/1988 | Pullukat et al. | |
| 5,016,857 A | 5/1991 | Bovee et al. | |
| 5,352,749 A | 10/1994 | DeChellis et al. | |
| 5,391,654 A | 2/1995 | Ahvenainen et al. | |
| 5,436,304 A | 7/1995 | Griffin et al. | |
| 5,455,314 A | 10/1995 | Burns et al. | |
| 5,565,174 A | 10/1996 | Burns et al. | |
| 5,565,175 A | 10/1996 | Hottovy et al. | |
| 5,575,979 A | 11/1996 | Hanson | |
| 6,045,661 A | 4/2000 | Kreischer et al. | |
| 6,127,495 A | 10/2000 | Rösch et al. | |
| 6,239,235 B1 | 5/2001 | Hottovy et al. | |
| 6,262,191 B1 | 7/2001 | Hottovy et al. | |
| 6,559,247 B2 | 5/2003 | Kufeld et al. | |
| 6,806,338 B2 | 10/2004 | Baann et al. | |
| 6,815,511 B2 | 11/2004 | Verser et al. | |
| 6,833,415 B2 | 12/2004 | Kendrick et al. | |
| 7,014,821 B2 | 3/2006 | Hottovy et al. | |
| 7,163,906 B2 | 1/2007 | McDaniel et al. | |
| 7,505,129 B2 | 3/2009 | Marrow et al. | |
| 7,517,947 B2 | 4/2009 | McElvain et al. | |
| 7,619,047 B2 | 11/2009 | Yang et al. | |
| 7,759,457 B2 | 7/2010 | Walworth | |
| 7,790,820 B2 | 9/2010 | Jensen et al. | |
| 7,812,104 B2 | 10/2010 | Canich et al. | |
| 7,910,679 B2 | 3/2011 | Kiss et al. | |
| 7,928,162 B2 | 4/2011 | Kiss et al. | |
| 7,939,610 B2 | 5/2011 | Kiss et al. | |
| 7,957,947 B2 | 6/2011 | Odi | |
| 7,960,487 B2 | 6/2011 | Yang et al. | |
| 7,964,699 B2 | 6/2011 | Marissal et al. | |
| 8,597,582 B2 | 12/2013 | Hottovy et al. | |
| 8,653,206 B2 | 2/2014 | Gessner et al. | |
| 8,710,161 B2 | 4/2014 | Fouarge et al. | |
| 8,871,886 B1 * | 10/2014 | Hottovy | C08F 210/14 422/131 |
| 8,883,940 B2 | 11/2014 | Kufeld et al. | |
| 8,921,498 B2 | 12/2014 | Kufeld et al. | |
| 9,096,694 B1 | 8/2015 | Gupta et al. | |
| 9,120,886 B2 * | 9/2015 | Hottovy | C08F 210/14 |
| 9,238,698 B2 | 1/2016 | Kufeld et al. | |
| 9,358,515 B2 | 6/2016 | Hottovy et al. | |
| 2004/0136881 A1 | 7/2004 | Verser et al. | |
| 2005/0091021 A1 | 4/2005 | Gupta et al. | |
| 2005/0272914 A1 | 12/2005 | McElvain et al. | |
| 2009/0004417 A1 | 1/2009 | Follestad et al. | |
| 2010/0144985 A1 | 6/2010 | Lee et al. | |
| 2011/0190465 A1 * | 8/2011 | Hottovy | B01J 8/005 526/348 |
| 2015/0259441 A1 | 9/2015 | Gupta et al. | |
| 2015/0329650 A1 | 11/2015 | Hottovy et al. | |
| 2016/0083486 A1 | 3/2016 | Kufeld et al. | |

FOREIGN PATENT DOCUMENTS

| | | |
|---|---|---|
| EP | 1914247 A1 | 4/2008 |
| EP | 2103634 A1 | 9/2009 |
| EP | 2336200 A1 | 6/2011 |
| WO | 02090400 A1 | 11/2002 |
| WO | 2004024780 A1 | 3/2004 |
| WO | 2006056763 A1 | 6/2006 |
| WO | 2009127643 A1 | 10/2009 |
| WO | 2011097119 A1 | 8/2011 |
| WO | 2014070608 A1 | 5/2014 |
| WO | 2014093088 A1 | 6/2014 |
| WO | 2015109184 A1 | 7/2015 |

OTHER PUBLICATIONS

Foreign communication from a related counterpart application—International Preliminary Report on Patentability, PCT/US2013/066842, May 5, 2015, 7 pages.

Foreign communication from a related counterpart application—International Search Report and Written Opinion, PCT/US2015/011757, Apr. 24, 2015, 9 pages.

Office Communication regarding a third-party submission dated Jul. 22, 2015 (23 pages), U.S. Appl. No. 14/492,527, filed Sep. 22, 2014.

Office Action dated Jan. 29, 2016 (26 pages), Application U.S. Appl. No. 14/810,734, filed Jul. 28, 2015.

Office Action (Final) dated Apr. 18, 2016 (17 pages), Application U.S. Appl. No. 14/810,734, filed Jul. 28, 2015.

Office Action dated Dec. 30, 2015 (34 pages), U.S. Appl. No. 14/725,954, filed May 29, 2015.

Notice of Allowance dated Mar. 28, 2016 (12 pages), U.S. Appl. No. 14/725,954, filed May 29, 2015.

Bell, Susan L., "Polyethylene by Borealis' Borstar Process," PEP Review No. 2005-6, Dec. 2005, 29 pages.

Foreign communication from a related counterpart application—International Search Report and Written Opinion, PCT/US2011/022812, Mar. 21, 2011, 9 pages.

Foreign communication from a related counterpart application—International Preliminary Report on Patentability, PCT/US2011/022812, Aug. 7, 2012, 7 pages.

Speight, James G., Lange's Handbook of Chemistry, Sixteenth Edition, 2005, Section 1.14, 1 page.

"Supercritical Loop Reactor Slurry Process for Producing Polyethylene and Polypropylene," Process Economics Program Report 19F, Jun. 1996, 134 pages.

Office Action dated Aug. 18, 2016 (42 pages), U.S. Appl. No. 14/962,228, filed Dec. 8, 2015.

* cited by examiner

US 9,605,095 B2

POLYMERIZATION PRODUCT PRESSURES IN OLEFIN POLYMERIZATION

CROSS-REFERENCE TO RELATED APPLICATIONS

This application is a continuation of and claims priority to U.S. patent application Ser. No. 14/810,734 filed Jul. 28, 2015 and published as U.S. Patent Application Publication No. US2015/0329650 A1, now abandoned which is a continuation of U.S. patent application Ser. No. 14/447,973 filed Jul. 31, 2014, now U.S. Pat. No. 9,120,886, which is a continuation of U.S. patent application Ser. No. 13/886,893 filed on May 3, 2013, now U.S. Pat. No. 8,871,886, and entitled "Polymerization Product Pressures in Olefin Polymerization," each of which is incorporated by reference herein in its entirety. This application is also a continuation-in-part of and claims priority to U.S. patent application Ser. No. 12/699,729 filed Feb. 3, 2010 and published as U.S. Patent Application Publication No. US2011/0190465 A1, and entitled "Compressible Liquid Diluent in Polyolefin Polymerization," now U.S. Pat. No. 9,358,515 which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the management of pressures downstream of a polymerization reactor.

BACKGROUND

Polyolefins such as polyethylene and polypropylene may be prepared by slurry polymerization. In this technique, feed materials such as diluent, monomer and catalyst are introduced to a loop reaction zone, forming a slurry in the reaction zone. In continuous loop reactors, the slurry circulates through the loop reaction zone, and the monomer reacts at the catalyst in a polymerization reaction. The polymerization reaction yields solid polyolefins in the slurry. A polymerization product having solid polyolefins is then transferred from the reactor and separated to recover the solid polyolefins. Operating pressures during transfer of the product can affect recovery of solid polyolefins; thus, pressure management can be important.

SUMMARY

Disclosed is a process for making a low density polymer in a polymerization reactor system, the process comprising polymerizing an olefin monomer, and optionally an olefin comonomer, in the presence of a diluent in a polymerization reactor to make a polymerization product slurry consisting of a liquid phase and a solid phase, wherein the solid phase comprises an olefin polymer having a density of between about 0.905 g/cm$^3$ to about 0.945 g/cm$^3$; and discharging the polymerization product slurry from the polymerization reactor through a continuous take-off valve to make a mixture further comprising a vapor phase.

In another aspect, disclosed is a process for pressure management of a polymerization product slurry withdrawn from a loop polymerization reactor in slurry polymerization, the process comprising conveying the polymerization product slurry through a continuous take-off valve, wherein the polymerization product slurry comprises a liquid phase and a solid phase; converting the polymerization product slurry to a mixture, wherein the mixture comprises at least a portion of the liquid phase, the solid phase, and a vapor phase; and conveying the mixture through a flashline heater; wherein, at least at one location downstream of the continuous take-off valve, the mixture comprises a pressure less than a bubble point pressure of the liquid phase.

DETAILED DESCRIPTION OF THE EMBODIMENTS

Disclosed herein are embodiments of a polymerization reactor system. Additionally, disclosed herein are processes for making low density polymers in the polymerization reactor system and for pressure management of a polymerization product flowing from a loop polymerization reactor to a separation vessel in slurry polymerization.

Figure 1:
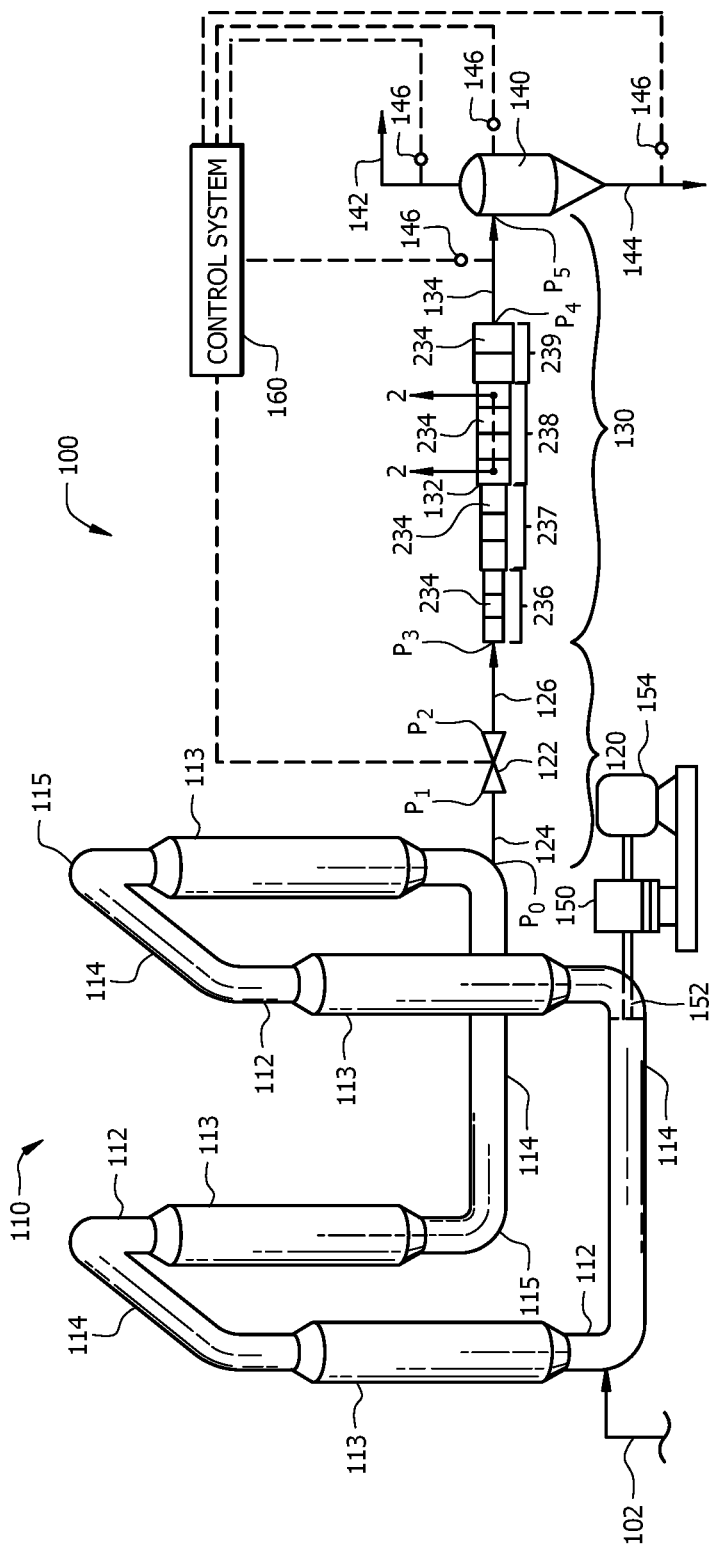
FIG. 1 shows a process flow diagram of an embodiment of a polymerization reactor system according to the disclosure.

FIG. 1 shows a process flow diagram of an embodiment of a polymerization reactor according to the disclosure. The system 100 may comprise a polymerization reactor 110 which forms a polymerization product, a first line 120 which receives a polymerization product (e.g., as a polymerization product slurry which is discharged from the polymerization reactor 110), a second line 130 which receives the polymerization product (e.g., as a mixture) from the first line 120, a separation vessel 140 which receives the polymerization product (e.g., as a gas phase mixture) from the second line 130, a control system 160 to control various components of the system 100, or combinations thereof. Solid polymer may be recovered from the separation vessel 140. The first line 120 may comprise a continuous take-off valve 122. The second line 130 may comprise a flashline heater 132.

As used herein, the terms "polymerization reactor" or "reactor" may include at least one loop slurry polymerization reactor capable of polymerizing olefin monomers, and optionally olefin comonomers, to produce homopolymers (e.g., polyethylene), or optionally, copolymers (e.g., polyethylene copolymer). Such homopolymers and copolymers may be referred to as resins or polymers.

In one or more of the embodiments disclosed herein, the reactor 110 may comprise any vessel or combination of vessels suitably configured to provide an environment for a chemical reaction (e.g., a contact zone) for monomers (e.g., ethylene) and/or polymers (e.g., an "active" or growing polymer chain), and optionally comonomers (e.g., 1-butene, 1-hexene, 1-octene, or combinations thereof) and/or copolymers, in the presence of a catalyst to yield a polymer (e.g., a polyethylene polymer) and/or copolymer.

In additional or alternative embodiments, the reactor 110 may polymerize olefin monomers, and optionally olefin comonomers, in the presence of a diluent to make a polymerization product slurry comprising a solid phase and a liquid phase, wherein the solid phase comprises an olefin polymer having a density as disclosed herein.

The polymerization processes performed in the reactor(s) disclosed herein (e.g., reactor 110) may include batch or continuous processes. Continuous processes can use intermittent or continuous product discharge. Processes may also include partial or full direct recycle of unreacted monomer, unreacted comonomer, and/or diluent.

According to one aspect, the loop slurry polymerization reactor 110 may comprise vertical or horizontal pipes 112 and 114 interconnected by smooth bends or elbows 115, which together form a loop. Portions of the loop slurry polymerization reactor 110, such as pipes 112, may have cooling jackets 113 placed therearound to remove excess heat generated by the exothermic polymerization reactions. A cooling fluid may be circulated through jackets 113, for example.

A motive device, such as pump 150, may circulate the fluid slurry in the loop slurry polymerization reactor 110. An example of the pump 150 is an in-line axial flow pump with a pump impeller 152 disposed within the interior of the reactor 140. The impeller 152 may, during operation, create a turbulent mixing zone within a reactor slurry circulating through the reactor 110 such that sufficient contact between different polymerization components within the slurry may occur. The impeller 152 may also assist in propelling the reactor slurry through the closed loop of the reactor 110 at sufficient speed to keep solid particulates, such as the catalyst or solid polymer, suspended within the reactor slurry. The impeller 152 may be driven by a motor 154 or other motive force.

The system 100 may additionally comprise any equipment associated with a polymerization reactor, such as pumps, control devices (e.g., a PID controller), measurement instruments (e.g., thermocouples, transducers, and flow meters), alternative inlet and outlet lines, etc.

A typical loop polymerization process is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Although the embodiment illustrated in FIG. 1 shows a single reactor 110, one of skill in the art viewing this disclosure will recognize that any suitable number and/or configuration of reactors may be employed.

In embodiments having multiple reactors, production of polymerization product in multiple reactors may include several stages in at least two separate polymerization reactors interconnected by a transfer device making it possible to transfer the polymerization product resulting from a first polymerization reactor into a second reactor (e.g., loop slurry polymerization reactor 110). The desired polymerization conditions in one reactor may be different from the polymerization conditions of the other reactor(s). Alternatively, polymerization in multiple reactors may include the manual transfer of polymerization product (e.g., as a polymerization product slurry, as a mixture, as solid polymer, or combinations thereof) from one reactor to subsequent reactors for continued polymerization. Multiple reactor systems may include any combination including, but not limited to, multiple loop reactors, a combination of loop and gas reactors, multiple high pressure reactors or a combination of high pressure with loop and/or gas reactors. The multiple reactors may be operated in series, in parallel, or combinations thereof.

In embodiments having multiple reactors, various types of reactors that may additionally be included in system 100 may comprise loop slurry polymerization reactors. Such reactors may have a loop configuration, such as the configuration of the loop slurry polymerization reactor 110 of FIG. 1.

In embodiments having multiple reactors, various types of reactors that may additionally be included in system 100 may comprise gas-phase reactors. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymerization product may be withdrawn from the reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

In embodiments having multiple reactors, various types of reactors that may additionally be included in system 100 may comprise high pressure reactors. High pressure reactors may comprise autoclave or tubular reactors. Tubular reactors may have several zones where fresh monomer (optionally, comonomer), initiators, or catalysts may be added. Monomer (optionally, comonomer) may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

In embodiments having multiple reactors, various types of reactors that may additionally be included in system 100 may comprise a solution polymerization reactor wherein the monomer (optionally, comonomer) may be contacted with the catalyst composition by suitable stirring or other means. A carrier comprising an inert organic diluent or excess monomer (optionally, comonomer) may be employed. If desired, the monomer and/or optional comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Conditions of a polymerization reactor, e.g., loop slurry polymerization reactor 110, which may be chosen and even controlled for polymerization efficiency and to provide resin properties include temperature, pressure and the concentrations of various reactants.

Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor such as loop slurry polymerization reactor 110 is typically less than 1,000 psig, for example, about 650 psig. Pressure for gas phase polymerization is usually at about 100 to 500 psig. High pressure polymerization in tubular or autoclave reactors is generally run at about 20,000 to 75,000 psig.

Polymerization reactors can also be operated in a supercritical region occurring at generally higher temperatures and pressures. Operation above the critical point of a pressure/temperature diagram (supercritical phase) may offer advantages.

In an embodiment, polymerization may occur in an environment having a suitable combination of temperature and pressure. For example, polymerization may occur at a pressure in a range of about 400 psi to about 1,000 psi; alternatively, about 550 psi to about 650 psi, alternatively, about 600 psi to about 625 psi; and a temperature in a range of about 150° F. to about 130° F., alternatively, from about 195° F. to about 120° F.

The concentration of various reactants can be controlled to produce solid polymer with certain physical and mechanical properties. The proposed end-use product that will be formed by the solid polymer and the method of forming that product determines the desired properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations and/or partial pressures of monomer, comonomer, hydrogen, co-catalyst, modifiers, and electron donors are important in producing these resin properties. In embodiments, comonomer may be used to control product density; hydrogen may be used to control product molecular weight; cocatalysts can be used to alkylate, scavenge poisons and control molecular weight; activator-support can be used to activate and support the catalyst; modifiers can be used to control product properties; electron donors can be used to affect stereoregularity, the molecular weight distribution, or molecular weight; or combinations thereof. In additional or alternative embodiments, the concentration of poisons may be minimized because poisons impact the reactions and product properties.

Polymerization reaction components of the reactor(s) disclosed herein (e.g., loop slurry polymerization reactor 110) may include monomers, comonomers, diluent, molecular weight control agents, catalyst, co-catalyst, any other desired co-reactants or additives, or combinations thereof.

In embodiments, a monomer may comprise an olefin. In additional or alternative embodiments, a monomer may comprise an alpha olefin. Suitable olefins include, but are not limited to, ethylene and propylene.

In embodiments, a comonomer may comprise an unsaturated olefin having 3 to 12 carbon atoms. For example, suitable comonomers may include, but are not limited to, propylene, 1-butene, 1-hexene, 1-octene, or combinations thereof.

In embodiments, a diluent may comprise unsaturated hydrocarbons having 3 to 12 carbon atoms. In embodiments, suitable diluents used in slurry polymerization processes may include, but are not limited to, the monomer being polymerized (examples described above), the comonomer being polymerized (examples described above), hydrocarbons that are liquids under reaction conditions, or combinations thereof. Further examples of suitable diluents include, but are not limited to, propane, cyclohexane, isobutane, n-butane, n-pentane, isopentane, neopentane, n-hexane, or combinations thereof. Some loop polymerization reactions can occur under bulk conditions where no diluent is used. An example is polymerization of propylene monomer as disclosed in U.S. Pat. No. 5,455,314, which is incorporated by reference herein in its entirety.

In embodiments, a suitable catalyst system for polymerizing the monomers and any comonomers may include, but is not limited to a catalyst(s) and, optionally, a co-catalyst(s) and/or a promoter(s). Nonlimiting examples of suitable catalyst systems include Ziegler Natta catalysts, Ziegler catalysts, chromium catalysts, chromium oxide catalysts, chromocene catalysts, metallocene catalysts, nickel catalysts, or combinations thereof. Nonlimiting examples of co-catalyst include triethylboron, methylaluminoxane, alkyls such as triethylaluminum, or combinations thereof. Suitable activator-supports may comprise solid super acid compounds. Catalyst systems suitable for use in this disclosure have been described, for example, in U.S. Pat. No. 7,619,047 and U.S. Patent Application Publication Nos. 2007/0197374, 2009/0004417, 2010/0029872, 2006/0094590, and 2010/0041842, each of which is incorporated by reference herein in its entirety.

In embodiments, a molecular weight control agent may comprise hydrogen, cocatalyst, modifiers, other polymerization reaction components recognized by one skilled in the art with the aid of this disclosure, or combinations thereof.

The polymerization reaction components may be introduced to an interior of the loop slurry polymerization reactor 110 via inlets or conduits at specified locations, such as feed line 102. The reaction components identified above (and others known to those skilled in the art with the aid of this disclosure) may form a suspension, i.e., a reactor slurry, that circulates through the loop formed by the loop slurry polymerization reactor 110. Generally, continuous processes may comprise the continuous introduction of polymerization components into the loop slurry polymerization reactor 110 and the continuous removal or withdrawal (e.g., via first line 120) of a polymerization product.

The polymerization product may be withdrawn from one or more reactors present in system 100, e.g., the loop slurry polymerization reactor 110, via first line 120. The withdrawn polymerization product may be conveyed through the first line 120 to the second line 130 (e.g., conveyed via a drop in pressure). Collectively, lines 120 and 130 may be referred to as a flashline between reactor 110 and separation vessel 140, wherein a portion, substantially all, or all (e.g., 100%) of liquid phase components present in the polymerization product are converted to gas phase components.

In embodiments such as the embodiment shown in FIG. 1, the first line 120 of the system 100 may comprise a continuous take-off valve (hereinafter "CTO valve") 122. In embodiments such as the embodiment shown in FIG. 1, the second line 130 may comprise a flashline heater 132.

The polymerization product may be conveyed through the second line 130 to the separation vessel 140. In embodiments, the second line 130 may be downstream of the first line 120. In embodiments, the first line may have an inner diameter of about 1 inch to about 8 inches, and the second line 130 may have an inner diameter of about 2 inches to about 10 inches. For example, at least a portion of the second line 130 may have an inner diameter in a range from about 2 inches to about 10 inches which is greater than an inner diameter of the first line 120 in a range from about 1 inch to about 8 inches. In additional embodiments, the inner diameter of the second line 130 may change (e.g., increase) along the length of the second line 130.

In embodiments, the polymerization product conveyed through first line 120 and/or second line 130 may be in the form of a polymerization product slurry, a mixture, or a gas phase product mixture. The form of the polymerization product (e.g., slurry, mixture, gas phase product mixture) may be a function of the conditions (e.g., temperature and pressure) present at a given location in lines 120 and 130.

In embodiments, the polymerization product slurry may convert to a mixture in the first line 120, the second line 130, or both. In an embodiment, the polymerization product slurry converts to a mixture in the first line 120. In an embodiment, the polymerization product slurry may convert to a mixture at a location proximate to or within the CTO valve 122. In an embodiment, the polymerization product slurry may convert to a mixture via a drop in pressure associated with the CTO valve 122 of the first line 120. In an additional or alternative embodiment, the mixture may then convert to a gas phase product mixture as the polymerization product is conveyed through first line 120 and/or second line 130. In an additional or alternative embodiment, the mixture may convert to a gas phase product mixture in the second line 130. In an additional or alternative embodiment, the mixture may convert to a gas phase product mixture in the flashline heater 132 of the second line 130. In embodiments, gas phase product mixtures may be present when gas phase reactors are used in place of or in addition to a loop slurry reactor.

In embodiments, the polymerization product slurry may comprise a solid phase and a liquid phase (e.g., a slurry of solid polymer and liquid phase diluent and/or monomer/comonomer (e.g., unreacted)). In additional or alternative embodiments, the polymerization product slurry may comprise one or more of hydrogen, nitrogen, methane, ethylene, ethane, propylene, propane, butane, isobutane, pentane, hexane, 1-hexene, octane, 1-octene, and heavier hydrocarbons.

In embodiments, the mixture may comprise at least a portion of the liquid phase, the solid phase, and a vapor phase (e.g., a three-phase mixture comprising liquid and gaseous diluent and/or monomer/comonomer (e.g., unreacted) and solid polymer). As the polymerization product slurry conveys through first line 120 and/or second line 130, a drop in pressure (e.g., associated with the CTO valve 122) in the first line 120, a heat zone (e.g., associated with the flashline heater 132) in the second line 130, or both, may cause at least a portion of the liquid phase of the polymerization product slurry to vaporize to yield the mixture comprising at least portion of the liquid phase (e.g., the remaining portion which is not vaporized at a given location in line 120 or line 130), the solid phase (e.g., which was in the polymerization product slurry), and a vapor phase comprising the vaporized portion of the liquid phase. In an embodiment, the vaporized portion includes portions of the liquid phase which vaporized from the polymerization slurry to yield the mixture. In an additional or alternative embodiment, the vaporized portion includes a portion of the liquid phase which vaporized from the mixture to yield a greater amount of the vapor phase in the mixture. In an embodiment, the liquid phase of the mixture may comprise a remaining portion which is not vaporized. In embodiments, the remaining portion of the liquid phase in the mixture may comprise less than about 90%, 80%, 70%, 60%, 50%, 40%, 30%, 20%, 10%, or less by weight of the liquid phase in the polymerization product slurry.

In embodiments, the gas phase product mixture may comprise a vapor phase and a solid phase (e.g., comprising solid polymer and vaporized diluent and/or monomer/comonomer (e.g., unreacted)). In an embodiment, the vapor phase may comprise the vaporized portion of the liquid phase which vaporized from the mixture to yield the gas phase product mixture (inclusive or exclusive of liquid entrained within the solid polymer as discussed below). In an embodiment, the gas phase product mixture is present in the flashline heater 132 as the polymerization product is transferred to the separation vessel 140.

In embodiments, the solid phase may comprise various solids, semi-solids, or combinations thereof. In an embodiment, the solid phase may comprise a solid polymer, a catalyst, a co-catalyst, or combinations thereof. In embodiments, the solid polymer may comprise polyethylene and/or a copolymer (e.g., polyethylene copolymer). In embodiments, the solid polymer may comprise a homopolymer, a copolymer, or combinations thereof. For example, the solid polymer may comprise a linear low density polyethylene. The homopolymer and/or the polymers of the copolymer may comprise a multimodal (e.g., a bimodal) polymer (e.g., polyethylene). In embodiments, the solid polymer may comprise a density less than about 0.945 $g/cm^3$; alternatively, less than about 0.930 $g/cm^3$; alternatively, less than about 0.925 $g/cm^3$. In embodiments, the solid polymer may comprise a density greater than about 0.905 $g/cm^3$; alternatively, greater than about 0.910 $g/cm^3$. In embodiments, the solid polymer may comprise a density in the range of about 0.905 $g/cm^3$ to about 0.945 $g/cm^3$; alternatively, in the range of about 0.912 $g/cm^3$ to about 0.925 $g/cm^3$.

In embodiments, the liquid phase may comprise a diluent (e.g., unreacted diluent), monomer (e.g., unreacted monomer), comonomer (e.g., unreacted comonomer), or combinations thereof. In embodiments, the liquid phase may comprise ethylene in a range of from about 0.1% to about 15%, alternatively, from about 1.5% to about 5%, alternatively, about 2% to about 4% by total weight of the liquid phase of the polymerization product. Ethane may be present in a range of from about 0.001% to about 4%, alternatively, from about 0.2% to about 0.5% by total weight of the polymerization product. Isobutane may be present in a range from about 80% to about 98%, alternatively, from about 92% to about 96%, alternatively, about 95% by total weight of the polymerization product.

In embodiments, the vapor phase may comprise the vaporized portion of the liquid phase. In embodiments, the vapor phase may comprise a diluent vapor (e.g., unreacted diluent vapor), monomer vapor (e.g., unreacted monomer vapor), comonomer vapor (e.g., unreacted comonomer vapor), or combinations thereof.

As used herein, an "unreacted monomer," for example, ethylene, refers to a monomer that was introduced into a polymerization reactor during a polymerization reaction but was not incorporated into a polymer. In embodiments, the unreacted monomer may comprise ethylene, propylene, 1-butene, 1-hexene, 1-octene, a heavier hydrocarbon having a double-bonded carbon in the first position, or combinations thereof.

As used herein, an "unreacted comonomer," refers to a comonomer that was introduced into a polymerization reactor during a polymerization reaction but was not incorporated into a polymer. In embodiments, the unreacted comonomer may comprise propylene, 1-butene, 1-hexene, 1-octene, a heavier hydrocarbon having a double-bonded carbon in the first position, or combinations thereof.

In embodiments, various lines may be used to connect the CTO valve 122 in the first line 120. For example, line 124 may connect the CTO valve 122 with the loop slurry polymerization reactor 110, and line 126 may connect the CTO valve 122 with the second line 130 (e.g., comprising the flashline heater 132). In alternative or additional embodiments, the CTO valve 122 may connect directly or indirectly to the loop slurry polymerization reactor 110. In alternative or additional embodiments, the CTO valve 122 may connect directly or indirectly to the flashline heater 132. In embodiments, the CTO valve 122 may have a diameter of about 1 inch to about 8 inches.

In embodiments, various lines may be used to connect the flashline heater 132 in the second line 130. For example, the flashline heater 132 may connect directly to the first line 120, and line 134 may connect the flashline heater 132 to the separation vessel 140. In alternative or additional embodiments, the flashline heater 132 may connect directly or indirectly to the first line 120. In alternative or additional embodiments, the flashline heater 132 may connect directly or indirectly to the separation vessel 140.

In the system 100 of FIG. 1, the first line 120 may have a drop in pressure, and the second line 130 may have a drop in pressure. In an embodiment, the drop in pressure of the first line 120 may be associated with the CTO valve 122. In an additional or alternative embodiment, the drop in pressure of the second line 130 may be associated with the flashline heater 132.

The total drop in pressure between the loop slurry polymerization reactor 110 and separation vessel 140 (i.e., the drop in pressure of the first line 120 summed with the drop in pressure of the second line 130) may comprises a drop in pressure from equal to or less than about 1,500 psig in the reactor 110 to equal to or greater than about 50 psig in the separation vessel 140; alternatively, a drop from equal to or less than about 1,000 psig to equal to or greater than about 100 psig; alternatively, a drop from equal to or less than about 650 psig to greater than or equal to about 135 psig. In an embodiment, the solid polymer comprises polyethylene, the diluent comprises isobutane, and the total drop in pressure comprises a drop in pressure from about 650 psig equal to or greater than about 150 psig. In an embodiment, the solid polymer comprises polypropylene, the diluent comprises isobutane, and the total pressure differential comprises a drop in pressure from about 650 psig to about 225 psig, alternatively, from about 650 psig to about 240 psig.

In FIG. 1, the drop in pressure of first line 120 may be characterized by a drop in pressure between any two pressures $P_0$, $P_1$, $P_2$, and $P_3$. In an embodiment, the drop in pressure between $P_1$ may be associated with the CTO valve 122. In an embodiment, the drop in pressure associated with the CTO valve 122 may depend on the position (e.g., valve rotation) of the valve, i.e., the degree by which the CTO valve 122 is open. For example, the CTO valve 122 may have a valve rotation of about 5°, 10°, 20°, 30°, 40°, 50°, 60°, 70°, 80°, 90°, or more.

In an embodiment, the drop in pressure between $P_1$ and $P_2$ may comprise a majority of the drop in pressure of first line 120. In an additional or alternative embodiment, the drop in pressure between $P_0$ and $P_2$ may comprise a majority of the drop in pressure of first line 120. In an additional or alternative embodiment, the drop in pressure between $P_1$ and $P_3$ may comprise a majority of the drop in pressure of first line 120.

The drop in pressure of the second line 130 may be characterized by a drop in pressure between any two pressures $P_3$, $P_4$, and $P_5$. In an embodiment, the drop in pressure between $P_3$ and $P_4$ may be associated with the flashline heater 132.

In an embodiment, the drop in pressure between $P_3$ and $P_4$ may comprise a majority of the drop in pressure of the second line 130. In an additional or alternative embodiment, the drop in pressure between $P_3$ and $P_5$ may comprise a majority of the drop in pressure of the second line 130. In an additional or alternative embodiment, the drop in pressure between $P_4$ and $P_5$ may comprise a majority of the drop in pressure of the second line 130.

In embodiments, the drop(s) in pressure of the first line 120 and second line 130 provide means of conveyance of the polymerization product between the polymerization reactor 110 and the separation vessel 140.

In an embodiment, the polymerization product in the first line 120, the second line 130, or both, may be heated such that the solid polymer in the polymerization product is conveyed through the first line 120 (e.g., the CTO valve 122), the second line 130 (e.g., the flashline heater 132), or both, at a temperature less than the melting temperature, softening temperature, swelling temperature, or combinations thereof, of the solid polymer in the polymerization product. In embodiments, the heating of the polymerization product may be controlled (e.g., via control system 160).

In an embodiment, the melting temperature of the solid polymer may comprise from about 180° F. to about 266° F.; alternatively, from about 221° F. to about 266° F.; alternatively, from about 180° F. to about 240° F.; alternatively, from about 221° F. to about 240° F.; alternatively, from about 248° F. to about 266° F. In an embodiment, the solid polymer is conveyed through the first line 120, the second line 130 (e.g., the flashline heater 132), or both, at a temperature below the temperature at which the solid polymer begins to melt, soften, swell, or combinations thereof.

In an embodiment, the solid polymer comprises polyethylene and the heating results in a solid polymer temperature of greater than or equal to about 0° F. and less than or equal to about 130° F.; alternatively, greater than or equal to about 0° F. and less than or equal to about 180° F.

In an embodiment, the solid polymer comprises polypropylene and the heating results in a solid polymer temperature of greater than or equal to about 0° F. and less than or equal to about 250° F.; alternatively, greater than or equal to about 0° F. and less than or equal to about 170° F.; alternatively, greater than or equal to about 0° F. and less than or equal to about 120° F.

For a given temperature, the liquid components (e.g., individually and/or in combination) of the liquid phase of the polymerization product may comprise a pressure at which bubbles begin to form (e.g., the pressure at which the liquid begins to vaporize), referred to herein as the "bubble point pressure." The liquid phase of the polymerization product, before being withdrawn and/or discharged from the polymerization reactor 110, is the liquid phase of the reaction slurry inside the polymerization reactor 110. During polymerization in the reactor 110, the reactor 110 may operate at a pressure such that the liquid phase (e.g., comprising liquids of diluent, monomer, comonomer, or combinations thereof) of the reactor slurry circulating in the reactor 110 has a pressure greater than the bubble point pressure of the liquid at the operating temperature of the reactor 110, in order to avoid bubbles forming in the reactor slurry, which can cause cavitation of the motive device (e.g., pump 150) and/or a serve as a barrier to circulation of the reactor slurry within the polymerization reactor 110. When the polymerization product is withdrawn and/or discharged (e.g., as a polymerization product slurry) from the reactor 110 (e.g., through the CTO valve 122), separation of the solid phase from the liquid phase is desired. In an embodiment, the liquid phase is separated from the solid phase via vaporization of one or more liquid components in the liquid phase in the first line 120 (e.g., comprising the CTO valve 122), second line 130 (e.g., comprising the flashline heater 132), or both. To facilitate vaporization the pressure of the polymerization product may be reduced below the operating pressure in the reactor 110. For example, a drop in pressure may be provided in the first line 120, and the pressure of the polymerization product may be reduced via the drop in pressure which is associated with the CTO valve 122 of the first line 120.

In an embodiment, the polymerization product (e.g., polymerization product slurry or product mixture) may be conveyed through the first line 120, the second line 130, or both, and subjected to a drop in pressure (e.g., via the CTO valve 122) such that the pressure of the polymerization product is reduced to below the bubble point pressure of one or more components of the liquid phase (e.g., in the slurry and/or in the mixture) at least at one location in the first line 120, the second line 130, or both. In an embodiment, the polymerization product (e.g., polymerization product slurry or product mixture) may be subjected to a drop in pressure (e.g., via the CTO valve 122) such that the pressure of the polymerization product is reduced to below the bubble point pressure of a component of the liquid phase, where the component comprises the diluent. In an additional or alternative embodiment, the polymerization product (e.g., polymerization product slurry or product mixture) may be subjected to a drop in pressure (e.g., via the CTO valve 122) such that the pressure of the polymerization product is reduced to below the bubble point pressure of a component of the liquid phase, where the component comprises the comonomer (e.g., unreacted). In an additional or alternative embodiment, the polymerization product (e.g., polymerization product slurry or product mixture) may be subjected to a drop in pressure (e.g., via the CTO valve 122) such that the pressure of the polymerization product is reduced to below the bubble point pressure of a component of the liquid phase, where the component comprises the monomer (e.g., unreacted). In an additional or alternative embodiment, the polymerization product (e.g., polymerization product slurry or product mixture) may be subjected to a drop in pressure (e.g., via the CTO valve 122) such that the pressure of the polymerization product is reduced to below the bubble point pressure of a component of the liquid phase, where the component comprises hydrogen.

In an embodiment, the at least one location in the first line 120, second line 130, both, is downstream of the drop in pressure (e.g., associated with the CTO valve 122 in the first line 120). For example, the location may be in line 126, the flashline heater 132, line 134, the separation vessel 140, or combinations thereof. In an additional or alternative embodiment, the at least one location of the first line 120, second line 130, or both, is downstream of the CTO valve 122. For example, a location may be in line 126, the flashline heater 132, line 134, or the separation vessel 140. In an additional or alternative embodiment, the at least one location of the first line 120, second line 130, or both, is upstream of a heat zone of the flashline heater 132. For example, a location may be in the CTO valve 122, in line 126, in second line 130 upstream of the heat zone (heat zone is described in more detail below), or in the flashline heater 132 upstream of a heat zone.

In embodiments, the drop(s) in pressure of the first and second lines 120 and 130 may vaporize the liquid phase conveyed through the first line 120 and/or second line 130. In embodiments, the drop in pressure of the first line 120 (e.g., associated with CTO valve 122), the drop in pressure of the second line 130 (e.g., associated with the flashline heater 132), the heating of the second line 130 (e.g., heating of a portion(s) the flashline heater 132), or combinations thereof may vaporize a substantial amount (e.g., at least about 50%, 75%, 90%, 95%, 99%, 99.5%, 99.9%, 99.99%, 99.999%, or 100% by weight of component) of the liquid phase in the polymerization product (e.g., polymerization product slurry or mixture) prior to delivery to the separation vessel 140. In an embodiment, the drop in pressure of the first line 120 (e.g., associated with the CTO valve 122), the drop in pressure of the second line 130 (e.g., associated with the flashline heater 132), the heating of the second line 130 (e.g., heating of a portion(s) the flashline heater 132), or combinations thereof may vaporize at least about 50%, 75%, 90%, 95%, 99%, 99.5%, 99.9%, 99.99%, 99.999%, or 100% by weight of component of the liquid phase, where the component is the diluent. In additional or alternative embodiment, the drop in pressure of the first line 120 (e.g., associated with the CTO valve 122), the drop in pressure of the second line 130 (e.g., associated with the flashline heater 132), the heating of the second line 130 (e.g., heating of a portion(s) the flashline heater 132), or combinations thereof may vaporize at least about 50%, 75%, 90%, 95%, 99%, 99.5%, 99.9%, 99.99%, 99.999%, or 100% by weight of component of the liquid phase, where the component is the comonomer (e.g., unreacted). In additional or alternative embodiment, the drop in pressure of the first line 120 (e.g., associated with the CTO valve 122), the drop in pressure of the second line 130 (e.g., associated with the flashline heater 132), the heating of the second line 130 (e.g., heating of a portion(s) the flashline heater 132), or combinations thereof may vaporize at least about 50%, 75%, 90%, 95%, 99%, 99.5%, 99.9%, 99.99%, 99.999%, or 100% by weight of component of the liquid phase, where the component is the monomer (e.g., unreacted). In additional or alternative embodiment, the drop in pressure of the first line 120 (e.g., associated with the CTO valve 122), the drop in pressure of the second line 130 (e.g., associated with the flashline heater 132), the heating of the second line 130 (e.g., heating of a portion(s) the flashline heater 132), or combinations thereof may vaporize at least about 50%, 75%, 90%, 95%, 99%, 99.5%, 99.9%, 99.99%, 99.999%, or 100% by weight of component of the liquid phase, where the component is hydrogen.

In an embodiment, the drop in pressure associated with the CTO valve 122 may vaporize or facilitate vaporization of at least about 10%, 20%, 30% 40%, 50%, 75%, 90%, 95%, 99%, 99.5%, 99.9%, 99.99%, 99.999%, or 100% by weight of a component of the liquid phase, where the component comprises diluent. In additional or alternative embodiment, the drop in pressure associated with the CTO valve 122 may vaporize or facilitate vaporization of at least about 10%, 20%, 30% 40%, 50%, 75%, 90%, 95%, 99%, 99.5%, 99.9%, 99.99%, 99.999%, or 100% by weight of a component of the liquid phase, where the component comprises comonomer (e.g., unreacted). In additional or alternative embodiment, the drop in pressure associated with the CTO valve 122 may vaporize or facilitate vaporization of at least about 10%, 20%, 30% 40%, 50%, 75%, 90%, 95%, 99%, 99.5%, 99.9%, 99.99%, 99.999%, or 100% by weight of a component of the liquid phase, where the component comprises hydrogen. In additional or alternative embodiment, the drop in pressure associated with the CTO valve 122 may vaporize or facilitate vaporization of at least about 10%, 20%, 30% 40%, 50%, 75%, 90%, 95%, 99%, 99.5%, 99.9%, 99.99%, 99.999%, or 100% by weight of a component of the liquid phase, where the component comprises monomer (e.g., unreacted).

In an embodiment, polymerization product in the first line 120, second line 130, or both, may be heated to vaporize the liquid phase of the polymerization product during conveyance therethrough. For example, the flashline heater 132 (as described herein) of the second line 130 may heat the polymerization product conveyed through the second line 130 to vaporize at least a portion of the liquid phase of the polymerization product.

In embodiments, the average velocity in the first line 120 and/or second line 130 may be in a range of about 25 ft/s (about 7.6 m/s) to about 270 ft/s (about 82.4 m/s); alternatively, in a range of about 40 ft/s (about 12.2 m/s) to about 160 ft/s (about 48.8 m/s). In an embodiment, the velocity of the polymerization product may be below a sonic velocity of the polymerization product. In embodiments, the velocity of the polymerization product through the first line 120 is different than the velocity of the polymerization product through the second line 130. In embodiments, the polymerization product may experience more than one velocity (e.g., before, through, and after the CTO valve 122) as the polymerization product transfers through the first line 120. In embodiments, the polymerization product may experience more than one velocity (e.g., different velocities for one or more segments of a flashline heater 132) as the polymerization product transfers through the second line 130.

In an embodiment, the CTO valve 122 may comprise a solids-tolerant valve. In an additional or alternative embodiment, the CTO valve 122 may comprise a plug valve, or a ball valve, such as a Vee-Ball valve. In an embodiment, the CTO valve 122 may comprise one or more valves.

In an embodiment, the CTO valve 122 may comprise a nominal diameter of about 1 inch to about 8 inches. In embodiments, the nominal diameter of the CTO valve 122 may be large enough that the drop in pressure associated with the CTO valve 122 reduces the pressure of the polymerization product passing therethrough to a pressure below the bubble point pressure of the liquid phase of the polymerization product.

In an embodiment, the nominal diameter of the CTO valve 122 may be large enough that the drop in pressure associated with the CTO valve 122 reduces the pressure of the polymerization product passing therethrough to a pressure below the bubble point pressure of the liquid phase of the polymerization product, while accounting for the back pressure in the CTO valve 122, the first line 120, the second line 130, the separation vessel 140, or combinations thereof. For example, the nominal diameter of the CTO valve 122 may be determined relative to the back pressure in the system 100 in order to reduce the pressure of the polymerization product to a pressure below the bubble point pressure of the liquid phase at a location in the first line 120, second line 130, or both.

As shown in FIG. 1, the flashline heater 132 may comprise a plurality of segments 234 connected in series. One or more of the plurality of segments 234 of the flashline heater 132 may comprise a segment set. For example, flashline heater 132 may have multiple segments, where a first segment set 236 comprises segments 234 (e.g., three segments which, for example, are not heated), a second segment set 237 comprises segments 234 (e.g., three segments which, for example, are heated), a third segment set 238 comprises segments 234 (e.g., three segments which, for example, are not heated), and a fourth segment set 239 comprises segments 234 (e.g., three segments, for example, which are heated).

In embodiments, a heat zone may comprise a zone of the flashline heater 132 which is heated. For example, the heat zone may comprise a portion of a segment 234, a segment 234, or a collection of segments (e.g., segment set 236, 237, 238, 239, or combinations thereof) which is/are heated as disclosed herein or heated by other means recognized in the art with the aid of this disclosure.

In embodiments, a segment set may comprise a group of the segments 234 of the flashline heater 132 which are connected in series and which may share a common parameter such as inner diameter, outer diameter, segment length, segment material, whether the segments are heated, or combinations thereof; alternatively, a single segment of the plurality of segments 234 may comprise a segment set which has a parameter different than other segments and/or segment sets. In other embodiments, segments in a segment set share a common parameter comprising inner diameter only; alternatively, outer diameter only, alternatively, segment length only.

The flashline heater 132 may be generally sized and configured to receive polymerization product from the first line 130 (e.g., from the CTO valve 122) and vaporize at least a portion of the liquid phase of the mixture flowing into the flashline heater 132, to convert the polymerization product to a gas phase mixture comprising polymer solids and a vapor phase of substantially all of the liquid phase.

In an embodiment, a liquid phase of the polymerization product may comprise a first portion not entrained within solid polymer and a second portion entrained within the solid polymer. In embodiments, the flashline heater 132 may vaporize substantially all (e.g., at least about 99%, 99.9%, 99.99%, 99.999%, or 100% by weight of liquid) of the first portion of the liquid phase (i.e., the portion not entrained within the solid polymer) in the polymerization product prior to delivery to the separation vessel 140. In embodiments, the flashline heater 132 may vaporize a substantial amount (e.g., at least about 75%, 90%, 95%, 99%, 99.5% or more by weight of entrained liquid) of the second portion of the liquid phase (i.e., the portion entrained within the solid polymer) in the polymerization product prior to delivery to the separation vessel 140.

Generally, the flashline heater 132 may be configured such that the travel time of the solid polymer through the flashline heater 132 is at least or greater than about 7.5 seconds; alternatively, greater than about 8 second; alternatively, greater than about 8.5 seconds; alternatively, greater than about 9 seconds; alternatively, greater than about 9.5 seconds; alternatively, greater than about 10 seconds; alternatively, greater than about 10.5 seconds; alternatively, greater than about 11 seconds. In embodiments, the flashline heater 132 may be configured such that the travel time of the solid polymer through the flashline heater 132 is about 7.5, 8, 8.5, 9, 9.5, 10, 10.5, 11, 11.5, or more seconds. As the polymerization product flows through the flashline heater 132, the temperature of its various components may approach equilibration. For example, the temperature between the vaporized first portion of the liquid, the solid polymer, and the second portion of the liquid may become substantially equilibrated or have a temperature difference of less than about 10° F.

Generally, at least one of the segments 234 may have an inner diameter greater than an inner diameter of a preceding segment. In an embodiment, at least one of the segments 234 may have an inner diameter greater than a diameter of the CTO valve 122. The inner diameters of the segments 234 may increase along the length of the flashline heater 132 as shown in FIG. 1. For example, segments 234 of segment set 237 have an inner diameter greater than preceding segments 234 of segment set 236, segments 234 of segment set 238 have an inner diameter greater than preceding segments 234 of segment sets 237 and 236, and segments 234 of segment set 239 have an inner diameter greater than preceding segments 234 of segment sets 238, 237, and 236.

In embodiments, the flashline heater 132 may have an inner diameter of about 2 inches to about 10 inches. In embodiments, the segments 234 may have an inner diameter of about 2 inches to about 10 inches. In embodiments, each of the segments 234 may have an outer diameter between about 4 and about 16 inches (e.g., about 4 inches, 5 inches, 6 inches, 7 inches, 8 inches, inches, 9 inches, 10 inches, 11 inches, 12 inches, 13 inches, 14 inches, 15 inches, or 16 inches).

In embodiments, the segments 234 may each have a length that is between about 5 feet and about 100 feet (e.g., about 10 feet, 15 feet, 20 feet, 25 feet, 30 feet, 35 feet, 40 feet or greater). Each of segments 234 may have the same or different length as other segments, and the length of each segment 234 may depend on the particular number of segments 234 employed and the total length of the flashline heater 132 in a given implementation. In embodiments, the flashline heater 132 may have a total length greater than about 100 feet; alternatively, greater than about 100 feet; alternatively, greater than about 300 feet; alternatively, greater than about 400 feet; alternatively, greater than about 500 feet; alternatively, greater than about 600 feet; alternatively, greater than about 700. In an embodiment, the flashline heater 132 may have a total length of about 560 feet; alternatively, about 630 feet; alternatively, about 700 feet.

In embodiments, the flashline heater 132 may have a length and one or more inner diameters such that the flashline heater 132 provides the polymerization product (e.g., polymerization product slurry, product mixture, or combinations thereof) a residence time of at least or greater than about 7.5; alternatively, greater than about 8 second; alternatively, greater than about 8.5 seconds; alternatively, greater than about 9 seconds; alternatively, greater than about 9.5 seconds; alternatively, greater than about 10 seconds; alternatively, greater than about 10.5 seconds; alternatively, greater than about 11 seconds. In embodiments, the flashline heater 132 may have a length and one or more inner diameters such that the flashline heater 132 provides the polymerization product a residence time of about 7.5, 8, 8.5, 9, 9.5, 10, 10.5, 11, 11.5, or more seconds.

The separation vessel 140 may recover solid polymer which is received from the second line 130. In one or more of the embodiments disclosed herein, the polymerization product flowing from the second line 130 (for example, a mixture of solid polymer and at least a portion, substantially all or all of the other components, e.g., diluent and/or unreacted monomer/comonomer, are in a gas phase) may be separated into solid polymer in line 144 and one or more gases in line 142 in separation vessel 140.

Any suitable technique may be used to separate the polymerization product to recover solid polymer. For example, the separation vessel 140 may comprise a vapor-liquid separator. Suitable embodiments of a vapor-liquid separator may include a distillation column, a flash tank, a filter, a membrane, a reactor, an absorbent, an adsorbent, a molecular sieve, a cyclone, or combinations thereof. In an embodiment, the separator comprises a flash tank. Not seeking to be bound by theory, such a flash tank may comprise a vessel configured to vaporize and/or remove low vapor pressure components from a high temperature and/or high pressure fluid.

In an embodiment, the separation vessel 140 may be configured such that polymerization product from second line 130 may be separated into solid phase and liquid (e.g., a condensate) phase components in line 144 and a gas (e.g., vapor) phase components in line 142. The solid phase may comprise solid polymer (e.g., polyethylene, optionally, a polyethylene copolymer). The liquid phase or condensate may comprise any liquid phase components such as diluent and/or unreacted monomer/comonomer. In some embodiments, line 144 comprises a concentrated slurry of the solid phase and liquid phase in comparison to the product slurry in lines 120 and 130. The gas or vapor phase may comprise vaporized solvents, diluent, unreacted monomers and/or optional unreacted comonomers, waste gases (e.g., secondary reaction products, such as contaminants and the like), or combinations thereof. The separations vessel 140 may be configured such that the polymerization product flowing in the second line 130 is flashed by heat, pressure reduction, or combinations thereof such that the enthalpy of the line is increased. This may be accomplished via a heater (e.g., a flashline heater 132). For example, a flashline heater comprising a double pipe may exchange heat by hot water or steam may be utilized.

In an alternative embodiment, the separation vessel 140 may be configured such that polymerization product from second line 130 may be separated into solid polymer in line 144 substantially or completely free of any liquid phase components, and into one or more gases in line 142. Suitable separation techniques include distilling, vaporizing, flashing, filtering, membrane screening, absorbing, adsorbing, cycloning, gravity settling, or combinations thereof, the polymerization product received in separation vessel 140 from the second line 130.

In an embodiment, the separation vessel 140 may operate at a pressure of from about 50 psig to about 500 psig; alternatively, from about 130 psig to about 190 psig; alternatively, at about 150 psig; alternatively, at about 135 psig.

In one or more embodiments, the gas in line 142 may comprise hydrogen, nitrogen, methane, ethylene, ethane, propylene, propane, butane, 1-butene, isobutane, pentane, hexane, 1-hexene, heavier hydrocarbons, or combinations thereof. In an embodiment, ethylene may be present in a range of from about 0.1% to about 15%, alternatively, from about 1.5% to about 5%, alternatively, about 2% to about 4% by total weight of the line. Ethane may be present in a range of from about 0.001% to about 4%, alternatively, from about 0.2% to about 0.5% by total weight of the line. Isobutane may be present in a range from about 80% to about 98%, alternatively, from about 92% to about 96%, alternatively, about 95% by total weight of the line.

The separation vessel 140 may additionally comprise any equipment associated with the separation vessel 140, such as control devices (e.g., a PID controller) and measurement instruments (e.g., thermocouples), and level control and measurement devices.

In an embodiment, the horizontal distance between the separation vessel 140 and the loop slurry polymerization reactor 110 may be adjusted to optimize layout and cost. In an embodiment, the separation vessel 140 which may be from about 0 to about 3,000 horizontal feet from the loop slurry polymerization reactor 110; alternatively, the separation vessel 140 may be from about 0 to about 1,500 horizontal feet from the loop slurry polymerization reactor 110; alternatively, the separation vessel 140 may be from about 100 to about 1,500 horizontal feet from the reactor 110; alternatively, the separation vessel 140 may be from about 100 to about 500 horizontal feet from the reactor 110; alternatively, the separation vessel 140 may be from about 100 to about 500 horizontal feet from the reactor 110. In various embodiments, the polymerization product may travel a linear distance through first line 120 and second 130 in x, y, and z coordinates, for example through circuitous pipe routing, that is greater than the horizontal distance, the vertical spacing/distance, or combinations thereof.

In embodiments, the system 100 may further comprise a control system 160 for controlling the withdrawal of polymerization product from the loop slurry polymerization reactor 110. The control system 160 may control, for example, the CTO valve 122 and/or control and/or measurement instruments for the loop slurry polymerization reactor 120 (e.g., sensors of weight percent solids, reactor pressure, supply of feed, fluidized bed height, etc., or combinations thereof). The control system 160 may additionally or alternatively monitor and maintain the amount of polymerization product in the loop slurry polymerization reactor 110 by controlling the flow of polymerization product from the reactor 110 to the separation vessel 160 via the first line 120 and second line 130. The control system 160 may additionally or alternatively monitor line conditions with sensors 146, e.g., for lines 134, 142, and 144. The control system 160 may additionally or alternatively monitor and maintain the level of solid polymer in the separation vessel 140, for example via one or more sensors 146. The control system 160 may additionally or alternatively control a heating of the flashline heater 132. In an embodiment, the control system 160 may adjust a flow of polymerization product in the first line 120 and/or second line 130 via adjustment of the CTO valve 122.

Figure 2:
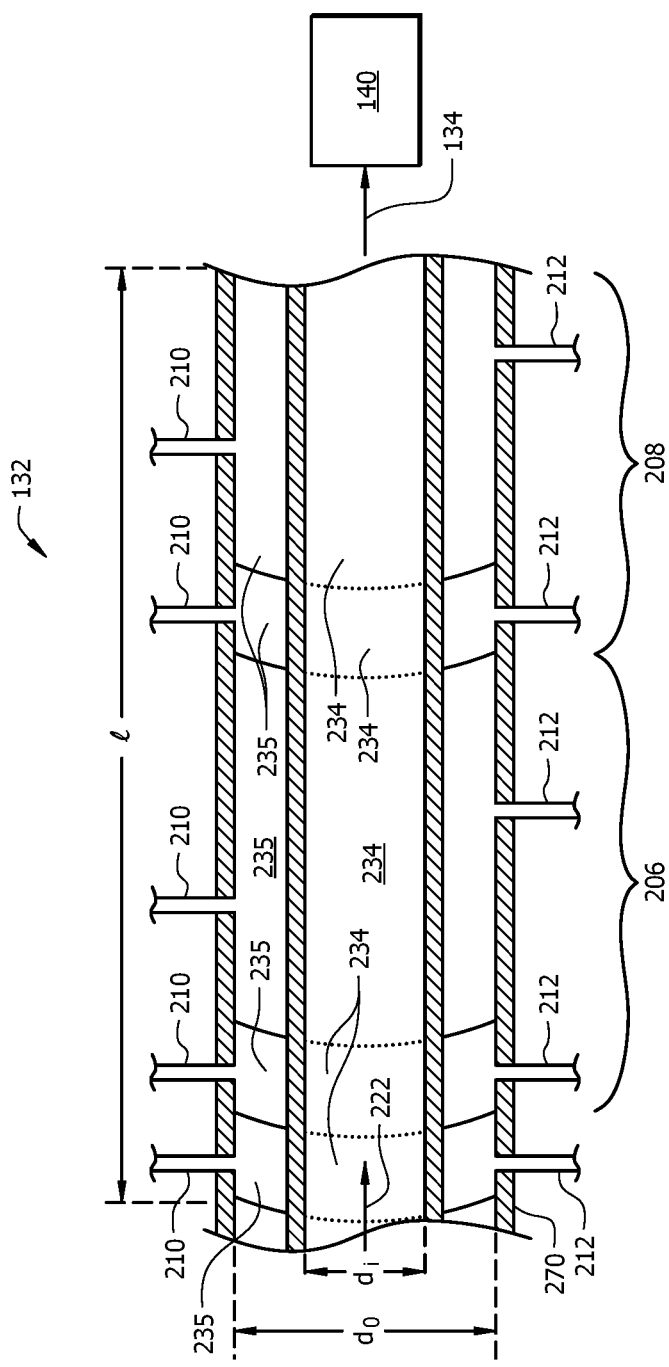
FIG. 2 shows a cross-sectional view of an embodiment of a portion of the flashline heater, taken along sight line 2-2 of FIG. 1.

FIG. 2 shows a cross-sectional view of an embodiment of a portion of the flashline heater 132, taken along sight line 2-2 of FIG. 1. The portion of the flashline heater 132 has length "t". As shown in FIG. 2, a polymerization product may enter the portion of the flashline heater 132 in the direction of arrow 222. At least a portion of the liquid components in polymerization product may convert to gas phase, thereby yielding a mixture in line 134 (e.g., polymer solids, gas phase components, and in some instances, remaining liquid phase components) which exits the portion of the flashline heater 132. In embodiments, substantially all the liquid phase components in the polymerization product may convert to gas phase, thereby yielding a gas phase product mixture in line 134. The characteristics (e.g., amount of gas and/or liquid phase of various components) of the product stream 134 delivered to the separation vessel 140 may depend on many factors including but not limited to a length "t" of the portion of the flashline heater 132, a diameter "$d_o$" of an outer conduit 270 of the flashline heater 132, an internal diameter "$d_i$" of the segments 234 of the flashline heater 132, the velocity of the product stream in the flashline heater 132, the velocity of the polymerization product in the flashline heater 132 in relation to the take-off velocity of the polymerization product, the chemical nature of the components within the polymerization product, the drop in pressure occurring upstream from the flashline heater 132 (e.g., in CTO valve 122), or combinations thereof.

To affect the vaporization of the liquid phase within the polymerization product, the flashline heater 132 may also include a plurality of segments 235 forming an outer conduit 270, which may wrap around at least a portion of one or more of the segments 234. The segments 235 may be configured to facilitate a flow of a warming medium through a portion or the entire outer conduit 270. The segments 235 may have the same or differing diameters and/or lengths as one another. In embodiments, the segments 235 may have correspondingly same or differing diameters and/or lengths as the segments 234 which they wrap around.

In an embodiment, the warming medium that flows through the segments 235 may allow the flashline heater 132 to heat the polymerization product in one or more heat zones, for example, length t, one or more sections (e.g., segment sets—contiguous or non-contiguous) of the flashline heater 132, or throughout the entire length of the flashline heater 132. That is, the segments 235 of the flashline heater 132 may increase, decrease, or maintain the temperature of the polymerization product as it flows through segments 234, which may allow for control of the heating rate and/or resulting temperature of the solid polymer as the polymerization product flows through the flashline heater 132, as portions of the liquid components of the polymerization product convert to gas phase, as the mixed phase product stream 134 exits the flashline 132, or combinations thereof. During operation, the warming medium may flow through one or more segments 235 of the outer conduit 270, which indirectly heats the polymerization product as the polymerization product flows through the segments 234. In other words, the warming medium flowing through one segment 235 may be substantially separated from the warming medium flowing through another segment 235, such that each segment 235 may be separated from the other, thereby allowing independent control of heating across one or more segments. Alternatively or additionally, two or more segments 235 may share a flow of warming medium. For example, the two or more segments 235 may share a single inlet and outlet. In some embodiments, the warming medium may be warmed coolant from the cooling jackets of the polymerization reactor (e.g., jackets 113 of FIG. 1), steam or steam condensate, hot oil, another heating source such as heat generated by electrical resistance heaters, or combinations thereof.

In embodiments, the flashline heater 132 may allow warming medium to flow through any one or a combination of the segments 235. For example, the heating medium may flow through a first set 206 of segments 235 but not through a second set 208 of segments 235, or any similar flow or temperature scheme, such as through every third segment, or through three segments and not through a fourth, and so on. For example, in the illustrated embodiment, the warming medium may flow into a respective inlet 210 and out of a respective outlet 212 of each one of the segments 235. Alternatively, combinations of segments 235 may have a common inlet and/or a common outlet. In one implementation, when the warming medium flows through the first set 206 of segments 235 but not the second set 208, it may initially warm the polymerization product such that substantially all of the liquid within the polymerization product is vaporized, followed by a period of cooling or temperature maintenance. Whether the second set 208 of segments 235 may be used to provide heat may depend on the measured levels of liquid (e.g., diluent) entrained within the solid polymer, the desired specifications of the solid polymer, desired solid polymer temperature, or combinations thereof. However, it should be noted that, in embodiments where the flashline heater 132 is configured to substantially continuously heat the polymerization product along a length of greater than about 700 feet, the solid polymer may begin to melt, which may cause difficulty in further processing. By controlling the amount of warming fluid flowing through each segment 235 or combination of segment sets (such as 206 and 208), an operator and/or controller may be able to adjust the temperature of the polymerization product to a desired level. In one embodiment, the temperature difference between the vapor and solid polymer in the mixed phase product stream 134 exiting the flashline heater 132 may be substantially negligible or the temperature of the solid polymer may approach about within 40° F., 20° F., 10° F., 5° F., or 1° F. of the temperature of the vapor. Further, the mixed phase product stream 134 may approach a thermal equilibrium, such that substantially all of the liquid present (e.g., liquid entrained in the solid polymer), the vapor and the solid polymer each have a temperature that differ from one another by no more than 1° F.

In an embodiment, the flashline heater 132 may reduce a boiling point of liquid in the polymerization product at a given pressure. In such an embodiment, the liquid may more readily vaporize in the flashline heater 132.

In additional or alternative embodiments, the vaporization and/or thermal equilibration may at least partially depend on the total length of the flashline heater 132. For example, the total length of the flashline heater 132 may at least partially determine the temperature of the product stream 134 as well as the extent of entrained liquid remaining within the solid polymer. In a general sense, the total length of the flashline heater 132 may at least partially determine how much time the polymerization product may spend in heated areas, in cooled areas, in areas of high and/or low pressure, and so on. In this way, the total length of the flashline heater 132 may at least partially determine the amount of time between full vaporization of liquids not associated or entrained within the solid polymer of the polymerization product and the delivery of the product stream 134 exiting the flashline heater to the separation vessel 140. Therefore, it should be noted that in some configurations, such as those with a substantially constant diameter and temperature, that as the total length of the flashline heater 132 increases, so may the transit time of the polymerization product through the flashline heater 132 and the likelihood that the first portion of the liquid phase is completely vaporized and the second portion of the liquid phase has been substantially vaporized (as described above).

While the total length of the flashline heater 132 may at least partially determine the transit time of the polymerization product, the diameters $d_i$ and $d_o$ may at least partially determine the rate at which the liquid phase within the polymerization product vaporizes. Therefore, the total length and diameters $d_i$ and $d_o$ of the flashline heater 132 may have a synergistic effect in determining the characteristics of the product stream 134 exiting the flashline heater and delivered to the separation vessel 140. Therefore, it should be noted that an increase in both the total length and the internal diameter $d_i$ relative to conventional dimensions may greatly increase the probability of full vaporization of liquids and/or temperature equilibration for the vapor, liquids, solid polymer, or combinations thereof.

In embodiments, the inner diameter $d_i$ of segments 234 may change along the length of the flashline heater 132. Therefore, the polymerization product may experience changing pressure proportional to the diameter change as it progresses through the flashline heater 132. Temperature and/or pressure changes may be substantially static (e.g., unchanging throughout the total length of the flashline heater 132 in time) or may be dynamic (e.g., changing throughout the total length of the flashline heater 132 in time). That is, the segments 234 may have different or the same heating temperatures, different or the same pressures, or combinations thereof.

To reach substantial vaporization and/or thermal equilibrium, in accordance with present embodiments, the polymerization product may flow through the flashline heater 132 through the segments 234 having internal diameter $d_i$. Substantially concurrently, the polymerization product is heated by a warming fluid within the outer conduit 270 having the diameter $d_o$, which may surrounds at least a portion of one or more of segments 234. According to the present approaches, either or both of these diameters may impact the rate at which liquids within the polymerization product vaporize. For example, in some embodiments, the inner diameter $d_i$ may be inversely proportional to the pressure within the flashline heater 132. That is, as the diameter $d_i$ increases, the pressure acting on the polymerization product may decrease, which may allow an increased rate of vaporization of the liquids. Also, as the $d_i$ increases, the velocity decreases and provides additional residence time for vaporization. Accordingly, in some embodiments, the internal diameter $d_i$ of the segments 234 is increased relative to conventional designs, such as to diameters of at least 2, 3, 4, 5, 6, 7, or 8 inches, or more.

An increase in the diameter $d_o$ may also increase the rate of vaporization of the liquids within the polymerization product. For example, the diameter $d_o$ may define the amount of warming fluid available to the outer surface of the segments 234 for indirectly heating the polymerization product. While the exchange of heat between the warming medium and the polymerization product may be substantially limited by the outer and inner surface areas of the segments 234, it should be noted that as the diameter $d_o$ of the outer conduit 270 increases, so may the amount of warming medium available for heat exchange. Accordingly, as the amount of warming medium within the outer conduit 270 increases, heat transfer to the polymerization product may have a minimized impact on the average temperature of the warming medium within the outer conduit 270. Therefore, by increasing the diameter $d_o$ relative to diameter $d_i$, more efficient heating of the polymerization product, and therefore vaporization of the liquids within the polymerization product, may be realized.

It should be noted, in light of the present discussion, that the diameter $d_o$ of the outer conduit 270, the diameter $d_i$ of one or more segments 234, the total length of the flashline heater 132, and their interrelation may at least partially determine the relative times of conversion for the liquid(s) of the polymerization product entering the flashline heater to convert to vapor in product stream 134 exiting the flashline heater 132.

Embodiments of the disclosure include processes for making a low density polymer in a polymerization reactor, for example, utilized by the system 100 of FIG. 1.

In an embodiment, a process comprises polymerizing an olefin monomer, and optionally an olefin comonomer, in the presence of a diluent in a polymerization reactor 110 to make a polymerization product slurry consisting of a liquid phase and a solid phase, wherein the solid phase comprises an olefin polymer having a density of between about 0.905 g/cm³ to about 0.945 g/cm³; and discharging the polymerization product slurry from the polymerization reactor through a continuous take-off valve 122 to make a mixture further comprising a vapor phase. The process may further comprise conveying the mixture downstream of the continuous take-off valve 122 at a temperature less than a melting temperature of the olefin polymer. The mixture may comprise a pressure less than a bubble point pressure of a component in the polymerization product slurry. In an embodiment, the component may comprise the diluent. In an additional or alternative embodiment, the component may comprise the comonomer. In an embodiment, a location of the mixture is downstream of the continuous take-off valve 122. In an additional or alternative embodiment, the location of the mixture is upstream of a heat zone in a flashline heater 132. In an embodiment, the vapor phase may comprise ethylene, isobutane, ethane, hydrogen, or combinations thereof. In an additional or alternative embodiment, the vapor phase may comprise a vaporized portion of the liquid phase. In an embodiment, the liquid phase may comprise the diluent, the monomer, a comonomer, or combinations thereof. In an embodiment, the diluent may comprise isobutane. In an additional or alternative embodiment, the monomer may comprise ethylene. In an additional or alternative embodiment, the comonomer may comprise propylene, 1-butene, 1-hexene, 1-octene, or combinations thereof. In an embodiment, the olefin polymer comprises polyethylene. In an additional or alternative embodiment, the olefin polymer further comprises a copolymer. In an additional or alternative embodiment, the olefin polymer comprises a linear low-density polyethylene. In an embodiment, the continuous take-off valve has a nominal diameter of about 1 inch to about 8 inches.

Embodiments of the disclosure include processes for pressure management of a polymerization product in slurry polymerization, for example, utilized by the system 100 of FIG. 1.

In an embodiment, a process comprises conveying the polymerization product slurry through a continuous take-off valve 122, wherein the polymerization product slurry comprises a liquid phase and a solid phase, converting the polymerization product slurry to a mixture, wherein the mixture comprises at least a portion of the liquid phase, the solid phase, and a vapor phase, and conveying the mixture through a flashline heater 132, wherein, at least at one location downstream of the continuous take-off valve, the mixture comprises a pressure less than a bubble point pressure of the liquid phase. In an embodiment, the process further includes conveying the mixture through the flashline heater 132 at a temperature less than a melting temperature of the solid polymer. In an embodiment, the liquid phase comprises a diluent, unreacted monomer, unreacted comonomers, or combinations thereof. In an embodiment, the diluent comprises isobutane, wherein the unreacted monomer comprises ethylene, wherein the unreacted comonomer comprises propylene, 1-butene, 1-hexene, 1-octene, or combinations thereof. In an embodiment, the vapor phase comprises a vaporized portion of the liquid phase. In an embodiment, the solid phase comprises a solid polymer. In an embodiment, the solid polymer comprises polyethylene. In an embodiment, the solid polymer further comprises a polyethylene copolymer. In an embodiment, the polyethylene comprises a density in the range of about 0.905 g/cm$^3$ to about 0.945 g/cm$^3$. In an embodiment, the polyethylene comprises a linear low-density polyethylene. In an embodiment, the continuous take-off valve 122 has a nominal diameter of about 1 inch to about 8 inches.

In embodiments where a low-density solid polymer is produced in the reactor 110, operating temperatures are generally lower than in embodiments where a high-density solid polymer is produced (e.g., to avoid swelling, softening, melting of the solid polymer in the reactor 110 which fouls the reactor 110). The lower temperature of the reactor 110 translates into a lower temperature which can be heated to in the flashline heater 132, in order to avoid swelling, softening, melting, or combinations thereof of the solid polymer in the flashline heater 132. As such, the drop in pressure associated with the CTO valve 122 below the bubble point pressure of one or more components of the liquid phase of the polymerization product facilitates vaporization of the liquid phase of the polymerization product in the system 100. Vaporization of the liquid phase which would otherwise not be vaporized reduces the amounts of liquid which reach the separation vessel 140, thus reducing the load on the separation vessel 140, other equipment downstream, in any recycle lines, or combinations thereof. The drop in pressure to a pressure below the bubble point pressure of a component in the liquid phase in the polymerization product may also provide a cooling effect which avoids swelling, softening, melting, or combinations thereof of the solid polymer as the polymerization product passes through the first line 120, the second line 130, or both. Managing the pressure of the polymerization product to below the bubble point pressure of one or more components of the liquid phase may also increase a production capacity for a given slurry polymerization system.

EXAMPLES

The disclosure having been generally described, the following prophetic or hypothetical examples are given as particular embodiments of the disclosure and to demonstrate the expected practice and advantages thereof. It is understood that these examples are given by way of illustration and is not intended to limit the specification or the claims in any manner.

Prophetic Example

Embodiment 1

Ethylene is polymerized to form polyethylene in one or more loop slurry polymerization reactors, such as reactor 110 in FIG. 1. The operating temperature of the reactor 110 is from about 60° C. to about 280° C. The operating pressure of the reactor 110 is about 650 psig. The monomer is ethylene. The diluent in the reactor 110 is isobutane, and the catalyst system is one of the catalyst systems described hereinabove. The isobutane, ethylene, and catalyst system are moved through the reactor 110 as a reactor slurry, for example, via motive device 150, where the ethylene and isobutane are in liquid phase, the catalyst system is in liquid and/or solid phase, and polyethylene formed by the polymerization reaction is in the solid phase. The operating pressure of the reactor 110 is above the bubble point pressure of the isobutane and the ethylene.

The reactor slurry is withdrawn and/or discharged from the reactor 110 as a polymerization product slurry comprising ethylene (e.g., unreacted, if any), isobutane, and polyethylene. The withdrawn polymerization product slurry is discharged through the CTO valve 122 such that the polymerization product slurry experiences a drop in pressure to a pressure below 650 psig, the operating pressure of the reactor 110. The drop in pressure facilitates vaporization of at least a portion of the liquid phase of the polymerization product slurry to yield a mixture. Additionally, the polymerization product slurry experiences a drop in pressure to a pressure below the bubble point pressure of ethylene, of isobutane, or both.

If the drop in pressure is to a pressure below the bubble point pressure of ethylene, then at least a portion of the ethylene in the liquid phase vaporizes as the mixture is conveyed downstream of the CTO valve 122. If the drop in pressure is to a pressure below the bubble point pressure of isobutane then at least a portion of the isobutane in the liquid phase vaporizes as the mixture is conveyed downstream of the CTO valve 122. If the drop in pressure is to a pressure below the bubble point pressure of ethylene and isobutane then at least a portion of the ethylene and isobutane in the liquid phase vaporizes as the mixture is conveyed downstream of the CTO valve 122.

The pressure which is below the bubble point pressure facilitates vaporization of the liquid phase of the polymerization product slurry and mixture, for example, in the production of linear low density polyethylene which requires lower operating pressures in the polymerization reactor 110.

Prophetic Example

Embodiment 2

Ethylene and 1-hexene are polymerized to form polyethylene and copolymer in one or more loop slurry polymerization reactors, such as reactor 110 in FIG. 1. The operating temperature of the reactor 110 is from about 60° C. to about 280° C. The operating pressure of the reactor 110 is about 650 psig. The monomer is ethylene, and the comonomer is 1-hexene. The diluent in the reactor 110 is isobutane, and the catalyst system is one of the catalyst systems described hereinabove. The isobutane, ethylene, 1-hexene, and catalyst system are moved through the reactor 110 as a reactor slurry, for example, via motive device 150, where the ethylene and isobutane are in liquid phase, the catalyst system is in liquid and/or solid phase, and polyethylene and copolymer formed by the polymerization reaction is in the solid phase. The operating pressure of the reactor 110 is above the bubble point pressure of the isobutane, ethylene, and 1-hexene.

The reactor slurry is withdrawn and/or discharged from the reactor 110 as a polymerization product slurry comprising ethylene (e.g., unreacted, if any), 1-hexene (e.g., unreacted, if any), isobutane, polyethylene, and copolymer. The withdrawn polymerization product slurry is discharged through the CTO valve 122 such that the polymerization product slurry experiences a drop in pressure to a pressure below 650 psig, the operating pressure of the reactor 110. The drop in pressure facilitates vaporization of at least a portion of the liquid phase of the polymerization product slurry to yield a mixture. Additionally, the polymerization product slurry experiences a drop in pressure to a pressure below the bubble point pressure of ethylene, of 1-hexene, of isobutane, or combinations thereof.

If the drop in pressure is to a pressure below the bubble point pressure of ethylene, then at least a portion of the ethylene in the liquid phase vaporizes as the mixture is conveyed downstream of the CTO valve 122. If the drop in pressure is to a pressure below the bubble point pressure of 1-hexene, then at least a portion of the 1-hexene in the liquid phase vaporizes as the mixture is conveyed downstream of the CTO valve 122. If the drop in pressure is to a pressure below the bubble point pressure of isobutane then at least a portion of the isobutane in the liquid phase vaporizes as the mixture is conveyed downstream of the CTO valve 122. If the drop in pressure is to a pressure below the bubble point pressure of ethylene and isobutane then at least a portion of the ethylene and isobutane in the liquid phase vaporizes as the mixture is conveyed downstream of the CTO valve 122. If the drop in pressure is to a pressure below the bubble point pressure of ethylene and 1-hexene then at least a portion of the ethylene and 1-hexene in the liquid phase vaporizes as the mixture is conveyed downstream of the CTO valve 122. If the drop in pressure is to a pressure below the bubble point pressure of isobutane and 1-hexene then at least a portion of the isobutane and 1-hexene in the liquid phase vaporizes as the mixture is conveyed downstream of the CTO valve 122.

The pressure which is below the bubble point pressure facilitates vaporization of the liquid phase of the polymerization product slurry and mixture, for example, in the production of linear low density polyethylene which requires lower operating pressures in the polymerization reactor.

Additional Description

Processes and systems for the production for pressure management of a polymerization product flowing from a loop polymerization reactor to a separation vessel in a slurry polymerization system have been described. The following are a first set of nonlimiting, specific embodiments in accordance with the present disclosure:

Embodiment 1 is a process for making a low density polymer in a polymerization reactor system, the process comprising polymerizing an olefin monomer, and optionally an olefin comonomer, in the presence of a diluent in a polymerization reactor to make a polymerization product slurry consisting of a liquid phase and a solid phase, wherein the solid phase comprises an olefin polymer having a density of between about 0.905 g/cm$^3$ to about 0.945 g/cm$^3$; and discharging the polymerization product slurry from the polymerization reactor through a continuous take-off valve to make a mixture further comprising a vapor phase.

Embodiment 2 is the process of embodiment 1, wherein the mixture comprises a pressure less than a bubble point pressure of a component in the polymerization product slurry.

Embodiment 3 is the process of embodiment 2, wherein the component is the diluent.

Embodiment 4 is the process of embodiment 2, wherein the component is the comonomer.

Embodiment 5 is the process of one of embodiments 1 to 4, wherein a location of the mixture is downstream of the continuous take-off valve.

Embodiment 6 is the process of one of embodiments 1 to 5, wherein the location of the mixture is upstream of a heat zone in a flashline heater.

Embodiment 7 is the process of one of embodiments 1 to 6, wherein the vapor phase comprises ethylene, isobutane, ethane, hydrogen, or combinations thereof.

Embodiment 8 is the process of one of embodiments 1 to 7, wherein the vapor phase comprises a vaporized portion of the liquid phase.

Embodiment 9 is the process of one of embodiments 1 to 8, wherein the liquid phase comprises the diluent, the monomer, the comonomer, or combinations thereof.

Embodiment 10 is the process of one of embodiments 1 to 9, wherein the diluent comprises isobutane, wherein the monomer comprises ethylene, wherein the comonomer comprises propylene, 1-butene, 1-hexene, 1-octene, or combinations thereof.

Embodiment 11 is the process of one of embodiments 1 to 10, further comprising conveying the mixture downstream of the continuous take-off valve at a temperature less than a melting temperature of the olefin polymer.

Embodiment 12 is the process of one of embodiments 1 to 11, wherein the olefin polymer comprises polyethylene.

Embodiment 13 is the process of embodiment 12, wherein the olefin polymer further comprises a copolymer.

Embodiment 14 is the process of one of embodiments 1 to 13, wherein the olefin polymer comprises a linear low-density polyethylene.

Embodiment 15 is the process of one of embodiments 1 to 14, wherein the continuous take-off valve has a nominal diameter of about 1 inch to about 8 inches.

Embodiment 16 is a process for pressure management of a polymerization product slurry withdrawn from a loop polymerization reactor in slurry polymerization, the process comprising conveying the polymerization product slurry through a continuous take-off valve, wherein the polymerization product slurry comprises a liquid phase and a solid phase; converting the polymerization product slurry to a mixture, wherein the mixture comprises at least a portion of the liquid phase, the solid phase, and a vapor phase; and conveying the mixture through a flashline heater; wherein, at least at one location downstream of the continuous take-off valve, the mixture comprises a pressure less than a bubble point pressure of the liquid phase.

Embodiment 17 is the process of embodiment 16, wherein the liquid phase comprises a diluent, unreacted monomer, unreacted comonomers, or combinations thereof.

Embodiment 18 is the process of embodiment 17, wherein the diluent comprises isobutane, wherein the unreacted monomer comprises ethylene, wherein the unreacted comonomer comprises propylene, 1-butene, 1-hexene, 1-octene, or combinations thereof.

Embodiment 19 is the process of one of embodiments 16 to 18, wherein the vapor phase comprises a vaporized portion of the liquid phase.

Embodiment 20 is the process of one of embodiments 16 to 19, wherein the solid phase comprises a solid polymer.

Embodiment 21 is the process of embodiment 20, further comprising conveying the mixture through the flashline heater at a temperature less than a melting temperature of the solid polymer.

Embodiment 22 is the process of one of embodiments 20 to 21, wherein the solid polymer comprises polyethylene.

Embodiment 23 is the process of embodiment 22, wherein the solid polymer further comprises a polyethylene copolymer.

Embodiment 24 is the process of one of embodiments 22 to 23, wherein the polyethylene comprises a density in the range of about 0.905 g/cm$^3$ to about 0.945 g/cm$^3$.

Embodiment 25 is the process of one of embodiments 22 to 24, wherein the polyethylene comprises a linear low-density polyethylene.

Embodiment 26 is the process of one of embodiments 16 to 25, wherein the continuous take-off valve has a nominal diameter of about 1 inch to about 8 inches.

Embodiment 27 is a process for pressure management of a polymerization product in slurry polymerization, the process comprising withdrawing a polymerization product slurry from a loop polymerization reactor, wherein the polymerization product slurry comprises a liquid phase and a solid phase; conveying the polymerization product slurry through a first line comprising a continuous take-off valve to yield a mixture, wherein the mixture comprises at least a portion of the liquid phase, the solid phase, and a vapor phase; and conveying the mixture through a second line comprising a flashline heater; wherein, at least at one location in the first line, the second line, or both, the mixture comprises a pressure less than a bubble point pressure of the liquid phase.

Embodiment 28 is the process of embodiment 27, wherein the at least one location in the first line, second line, or both is downstream of the continuous take-off valve.

Embodiment 29 is the process of one of embodiments 27 to 28, wherein the at least one location in the first line, second, or both is upstream of a heat zone in the flashline heater.

Embodiment 30 is the process of one of embodiments 27 to 29, further comprising providing a drop in pressure in the first line, wherein the at least one location in the first line, second line, or both is downstream of the drop in pressure.

Embodiment 31 is the process of embodiment 30, wherein the drop in pressure is associated with the continuous take-off valve.

Embodiment 32 is the process of one of embodiments 27 to 31, wherein the liquid phase comprises a diluent, unreacted monomer, unreacted comonomer, or combinations thereof.

Embodiment 33 is the process of embodiment 32, wherein the diluent comprises isobutane, wherein the unreacted monomer comprises ethylene, wherein the unreacted comonomer comprises propylene, 1-butene, 1-hexene, 1-octene, or combinations thereof.

Embodiment 34 is the process of one of embodiments 27 to 33, wherein the vapor phase comprises a vaporized portion of the liquid phase.

Embodiment 35 is the process of one of embodiments 27 to 34, wherein the solid phase comprises a solid polymer.

Embodiment 36 is the process of one of embodiments 27 to 35, further comprising conveying the mixture through the second line at a temperature less than a melting temperature of the solid polymer.

Embodiment 37 is the process of one of embodiments 35 to 36, wherein the solid polymer comprises polyethylene.

Embodiment 38 is the process of embodiment 37, wherein the solid polymer further comprises a polyethylene copolymer.

Embodiment 39 is the process of one of embodiments 37 to 38, wherein the polyethylene comprises a density in the range of about 0.905 g/cm$^3$ to about 0.945 g/cm$^3$.

Embodiment 40 is the process of one of embodiments 37 to 39, wherein the polyethylene comprises a linear low-density polyethylene.

Embodiment 41 is the process of one of embodiments 27 to 40, wherein the continuous take-off valve has a nominal diameter of about 1 inch to about 8 inches.

Embodiment 42 is a system for pressure management of a polymerization product in slurry polymerization comprising a loop slurry polymerization reactor which forms polymerization product, a first line which receives a polymerization product from the loop slurry polymerization reactor, a second line which receives the polymerization product from the first line, and a separation vessel which receives the polymerization product from the second line.

Embodiment 43 is the system of embodiment 42, wherein a solid polymer is recovered from the separation vessel.

Embodiment 44 is the system of one of embodiments 42 to 43, wherein the first line comprises a continuous take-off valve.

Embodiment 45 is the system of one of embodiments 42 to 44, wherein the second line comprises a flashline heater.

Embodiment 46 is the system of one of embodiments 44 to 45, wherein the continuous take-off valve provides a drop in pressure for the polymerization product conveyed through the first line.

Embodiment 47 is the system of one of embodiments 42 to 46, wherein the polymerization product comprises a liquid phase, wherein a pressure of the polymerization product is below a bubble-point pressure of the liquid phase at least at one location in the first line, the second line, or both.

Processes and systems for the production for pressure management of a polymerization product flowing from a loop polymerization reactor to a separation vessel in a slurry polymerization system have been described.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process for pressure management of a polymerization product comprising a liquid phase and a solid phase, the process comprising:
   reducing, at a location downstream of a polymerization reactor and upstream of a flashline heater, a pressure of the polymerization product to less than a bubble point pressure of at least one component of the liquid phase, where the location is within or downstream of a continuous take-off valve and is upstream of the flashline heater and wherein the continuous take-off valve has a nominal diameter of about 1 inch to about 8 inches.

2. The process of claim 1, wherein at least a portion of the liquid phase vaporizes to yield a vaporized portion of the liquid phase.

3. The process of claim 1, wherein the flashline heater is upstream of a separation vessel.

4. The process of claim 1, wherein the at least one component of the liquid phase comprises isobutane; ethylene; a comonomer comprising one or more of propylene, 1-butene, 1-hexene, and 1-octene; or combinations thereof.

5. The process of claim 1, wherein the continuous take-off valve comprises more than one valve.

6. A process for pressure management of a polymerization product comprising a liquid phase and a solid phase, the process comprising:
   reducing, using a continuous take-off valve positioned downstream of a polymerization reactor and upstream of a flashline heater, a pressure of the polymerization product to less than a bubble point pressure of at least one component of the liquid phase, wherein the continuous take-off valve comprises more than one valve.

7. The process of claim 6, wherein at least a portion of the liquid phase vaporizes to yield a vaporized portion of the liquid phase.

8. The process of claim 6, wherein the at least one component of the liquid phase comprises isobutane; ethylene; a comonomer comprising one or more of propylene, 1-butene, 1-hexene, and 1-octene; or combinations thereof.

9. The process of claim 6, wherein the continuous take-off valve has a nominal diameter of about 1 inch to about 8 inches.

10. A process for pressure management of a polymerization product comprising about 0.001% to about 4% ethane by total weight of a liquid phase of the polymerization product, the process comprising:
    reducing a pressure of the polymerization product to less than a bubble point pressure of at least one component of the liquid phase of the polymerization product such that at least a portion of the liquid phase vaporizes to yield a vapor phase comprising a vaporized portion of the liquid phase and the ethane,
    wherein the step of reducing is performed at a location downstream of a polymerization reactor and upstream of a flashline heater, wherein the location is within or downstream of a continuous take-off valve and is upstream of the flashline heater, and wherein the continuous take-off valve has a nominal diameter of about 1 inch to about 8 inches.

11. The process of claim 10, wherein the flashline heater is upstream of a separation vessel.

12. The process of claim 10, wherein the continuous take-off valve comprises more than one valve.

13. The process of claim 10, wherein the at least one component of the liquid phase comprises isobutane; ethylene; a comonomer comprising one or more of propylene, 1-butene, 1-hexene, and 1-octene; or combinations thereof.

14. The process of claim 1, wherein the solid phase comprises polyethylene having a density in a range of from equal to or greater than about 0.905 g/cm$^3$ to equal to or less than about 0.945 g/cm$^3$.

15. The process of claim 14, wherein the polymerization reactor is a loop polymerization reactor in slurry polymerization.

16. The process of claim 15, wherein the at least one component of the liquid phase comprises isobutene.

17. The process of claim 6, wherein the solid phase comprises polyethylene having a density in a range of from equal to or greater than about 0.905 g/cm$^3$ to equal to or less than about 0.945 g/cm$^3$.

18. The process of claim 17, wherein the polymerization reactor is a loop polymerization reactor in slurry polymerization.

19. The process of claim 18, wherein the at least one component of the liquid phase comprises isobutene.

20. The process of claim 10, wherein the polymerization reactor is a loop polymerization reactor in slurry polymerization and wherein the at least one component of the liquid phase comprises isobutene.

* * * * *